United States Patent
Zalamea Bustillo

(10) Patent No.: US 12,304,179 B2
(45) Date of Patent: May 20, 2025

(54) MULTI-LAYERED POLYETHYLENE FILMS ORIENTED IN THE MACHINE DIRECTION AND ARTICLES COMPRISING THE SAME

(71) Applicant: Dow Global Technologies LLC, Midland, MI (US)

(72) Inventor: Luis Gerardo Zalamea Bustillo, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 36 days.

(21) Appl. No.: 17/768,886

(22) PCT Filed: Oct. 14, 2020

(86) PCT No.: PCT/US2020/055477
§ 371 (c)(1),
(2) Date: Apr. 14, 2022

(87) PCT Pub. No.: WO2021/076552
PCT Pub. Date: Apr. 22, 2021

(65) Prior Publication Data
US 2024/0092066 A1   Mar. 21, 2024

Related U.S. Application Data

(60) Provisional application No. 62/915,089, filed on Oct. 15, 2019.

(51) Int. Cl.
*B32B 27/08*       (2006.01)
*B29C 48/00*       (2019.01)
(Continued)

(52) U.S. Cl.
CPC .......... *B32B 27/08* (2013.01); *B29C 48/0018* (2019.02); *B29C 48/022* (2019.02);
(Continued)

(58) Field of Classification Search
CPC .......... B32B 27/08; B32B 7/02; B32B 27/32; B32B 2250/40; B32B 2270/00;
(Continued)

(56) References Cited

U.S. PATENT DOCUMENTS

| | | | |
|---|---|---|---|
| 6,391,411 B1 | 5/2002 | Duckwall, Jr. et al. |
| 6,613,841 B2 | 9/2003 | Williams |

(Continued)

FOREIGN PATENT DOCUMENTS

| | | |
|---|---|---|
| WO | 2016135213 A1 | 9/2016 |
| WO | 2018071250 A1 | 4/2018 |

OTHER PUBLICATIONS

International Search Report & Written Opinion for related PCT Application PCT/US2020/055477, mailed Jan. 22, 2021 (13 pgs).

(Continued)

*Primary Examiner* — Michael C Miggins

(57) ABSTRACT

The present disclosure provides for a machine direction oriented polyethylene (MDO-PE) film, a laminate comprising the MDO-PE film and a method of forming the MDO-PE film. The MDO-PE film includes a core layer comprising a first ethylene-based polymer a skin layer comprising a second ethylene-based polymer and a sub-skin layer in-between and in contact with the core layer and the skin layer. Each value for the density, peak melting point and percent crystallinity by weight increases from the core layer to the sub-skin layer and from the sub-skin layer to the skin layer. The MDO-PE film further includes predetermined values for a ratio of the percent crystallinity by weight of the core layer to the skin layer and a ratio of the peak melting point of the core layer to the skin layer. The MDO-PE film can be useful in food package, among other areas.

15 Claims, 4 Drawing Sheets

(51) Int. Cl.
*B29C 48/08* (2019.01)
*B29C 48/21* (2019.01)
*B29C 55/06* (2006.01)
*B29L 31/00* (2006.01)
*B32B 7/02* (2019.01)
*B32B 27/32* (2006.01)
*B65D 65/40* (2006.01)

(52) U.S. Cl.
CPC .............. *B29C 48/08* (2019.02); *B29C 48/21* (2019.02); *B29C 55/06* (2013.01); *B32B 7/02* (2013.01); *B32B 27/32* (2013.01); *B65D 65/40* (2013.01); *B29K 2023/06* (2013.01); *B29K 2995/0041* (2013.01); *B29K 2995/0051* (2013.01); *B29K 2995/0063* (2013.01); *B29L 2031/712* (2013.01); *B32B 2250/242* (2013.01); *B32B 2250/40* (2013.01); *B32B 2270/00* (2013.01); *B32B 2307/414* (2013.01); *B32B 2307/516* (2013.01); *B32B 2307/704* (2013.01); *B32B 2307/72* (2013.01); *B32B 2307/7376* (2023.05); *B32B 2439/70* (2013.01)

(58) Field of Classification Search
CPC ........ B32B 2307/414; B32B 2307/516; B32B 2307/704; B32B 2307/72; B32B 2307/7376; B32B 2439/70; B29K 2023/06; B29K 2995/0041; B29K 2995/0063

See application file for complete search history.

(56) References Cited

U.S. PATENT DOCUMENTS

| | | | |
|---|---|---|---|
| 7,011,892 | B2 | 3/2006 | Breese |
| 7,807,770 | B2 | 10/2010 | Lambert et al. |
| 8,673,451 | B2 | 3/2014 | Botros |
| 9,802,394 | B2 | 10/2017 | Cavacas |
| 10,328,678 | B2 | 6/2019 | Nummila-Pakarinen et al. |
| 11,186,706 | B2 | 11/2021 | Tran et al. |
| 2005/0287359 | A1 | 12/2005 | Breese |
| 2006/0177641 | A1 | 8/2006 | Breese et al. |
| 2010/0009156 | A1 | 1/2010 | Daviknes et al. |
| 2010/0304062 | A1 | 12/2010 | Daviknes et al. |
| 2015/0251388 | A1 | 9/2015 | Niedersuess |
| 2017/0274574 | A1 | 9/2017 | Borse et al. |
| 2018/0079880 | A1 | 3/2018 | Miyake et al. |
| 2018/0126695 | A1 | 5/2018 | Niedersüss et al. |
| 2018/0370202 | A1 | 12/2018 | Niedersüss et al. |

OTHER PUBLICATIONS

International Preliminary Report on Patentability for related PCT Application PCT/US2020/055477, mailed Apr. 28, 2022 (9 pgs).

MULTI-LAYERED POLYETHYLENE FILMS ORIENTED IN THE MACHINE DIRECTION AND ARTICLES COMPRISING THE SAME

This application is a National Stage Application under 35 U.S.C. § 371 of International Application Number PCT/US2020/055477, filed Oct. 14, 2020 and published as WO 2021/076552 on Apr. 22, 2021, which claims the benefit to U.S. Provisional Application 62/915,089, filed Oct. 15, 2019, the entire contents of which are incorporated herein by reference in its entirety

TECHNICAL FIELD

The present disclosure relates to uniaxially oriented, multi-layered polyethylene films and in particular to multi-layered films oriented in the machine direction. Such films can be particularly useful in articles such as flexible packaging.

BACKGROUND

Polyethylene films are widely used in flexible packaging, such as heavy duty shipping sacks, stand-up pouches, detergent pouches and sachets, among others. Depending on the application, a variety of properties may be needed in terms of integrity and/or attractiveness. Such properties can include: (1) excellent optical properties, such as high gloss, high clarity and low haze; (2) sufficient abuse resistance, such as high tensile strength, high puncture, stiffness and impact resistance; and/or (3) good sealing properties, such as low seal initiation temperature, broad sealing window, high seal strength and high hot tack.

Conventional blown or cast polyethylene films were widely used in flexible packaging, either as stand-alone packaging or lamination film. A significant goal in producing polyethylene films for flexible packaging is in the production of an all polyethylene recyclable flexible film for packaging formats. With market trends towards sustainability, however, flexible packaging continues to be down gauged. Polyethylene films used in packaging applications have been down gauged using different methods by film converters and others in search of thinner, tougher, stiffer and lower cost solutions to their needs and their customers' needs. Often, however, the polyethylene film needs to be blended with one or non-polyethylene resins or laminated with another non-polyethylene film(s) (e.g., polyethylene terephthalate, polypropylene, among others) to achieve the desired physical film properties. Such flexible film structures are difficult or impossible to recycle.

Biaxially oriented films (e.g., biaxially oriented polypropylene films and biaxially oriented polyethylene films) and cast polypropylene films have been found to provide good stiffness and toughness while down gauging in some instances. Machine direction oriented (MDO) films are another approach to providing stiffness and optical properties to films. However, when oriented significantly in the machine direction (e.g., at draw ratios of 6:1 to 10:1), such films can become weak in tear strength in the machine direction due to the unidirectional orientation. As films are stretched at high ratios in the machine direction, the films are expected to more likely exhibit fibrillation in the machine direction and/or significant drops in tear strength in the machine direction. It would thus be desirable to have new machine direction oriented all polyethylene recyclable flexible film that provide significant down gauging while providing desirable mechanical properties.

SUMMARY OF DISCLOSURE

The present disclosure provides for a new machine direction oriented all polyethylene flexible film that provide significant down gauging while providing desirable mechanical properties, as are set out in the present disclosure. As the machine direction oriented polyethylene film is all polyethylene it may provide for better recyclability while still providing for flexible packaging that can be down gauged (e.g., undergo a high machine direction stretch ratio) while still achieving the desired physical film properties of optical clarity, stiffness and toughness.

The present disclosure provides for a machine direction oriented polyethylene (MDO-PE) film that includes (a) a core layer comprising a first ethylene-based polymer; (b) a skin layer comprising a second ethylene-based polymer; and (c) a sub-skin layer in-between and in contact with the core layer and the skin layer, the sub-skin layer comprising a third ethylene-based polymer. The core layer comprising the first ethylene-based polymer has a density of 0.870 g/cm$^3$ to 0.920 g/cm$^3$ measured according to ASTM D 792, a peak melting point of 82 to 126° C. and a percent crystallinity by weight of 15 to 30 calculated according to Equation 1 as provided herein. The skin layer comprising the second ethylene-based polymer has a density of 0.940 g/cm$^3$ to 0.965 g/cm$^3$ measured according to ASTM D 792, a peak melting point of 130 to 135° C. and a percent crystallinity by weight of 30 to 80 calculated according to Equation 1 as provided herein. The sub-skin layer comprising the third ethylene-based polymer has a density of 0.920 g/cm$^3$ to 0.950 g/cm$^3$ measured according to ASTM D 792, a peak melting point of 125 to 130° C. and a percent crystallinity by weight of 40 to 65 calculated according to Equation 1 as provided herein. For the various embodiments, each value for the density, peak melting point and percent crystallinity by weight increases from the core layer to the sub-skin layer and from the sub-skin layer to the skin layer, and a ratio of the percent crystallinity by weight of the core layer to the skin layer has a value of 0.25 to 0.91 and a ratio of the peak melting point of the core layer to the skin layer, each expressed in the Kelvin temperature scale, has a value of 0.870 to 0.990.

For the various aspects, ratios and relationships of the various physical properties of the first ethylene-based polymer, the second ethylene-based polymer and the third ethylene-based polymer can have predetermined values, as provided herein, that allow for the MDO-PE film of the present disclosure to have the desirable mechanical properties discussed herein. For example, the present disclosure provides for a ratio of the density of the core layer to the skin layer having a value of 0.90 to 0.98. The present disclosure further provides the MDO-PE film where the ratio of the percent crystallinity by weight of the core layer to the skin layer has a value of 0.5 to 0.8 and the ratio of the peak melting point of the core layer to the skin layer, each expressed in the Kelvin temperature scale, has a value of 0.892 to 0.973. For the various aspects, from the core layer to the sub-skin layer the value of the crystallinity can increase from 5 to 80 percent and from the sub-skin layer to the skin layer the value can increase from 18 to 32 percent. In additional aspects of the present disclosure, from the core layer to the sub-skin layer the value of the peak melting point increases from 1.5 to 50 percent and from the sub-skin layer to the skin layer the value increases from 5 to 7 percent. In more specific aspects of the present disclosure, the core layer has a density of 0.870 g/cm³ to 0.890 g/cm³ measured according to ASTM D 792; the skin layer has a density of 0.940 g/cm³ to 0.950 g/cm³ measured according to ASTM D 792 and the sub-skin layer has a density of 0.930 g/cm³ to 0.940 g/cm³ measured according to ASTM D 792.

The MDO-PE film of the present disclosure can have a thickness of 10 to 125 micrometers (μm). For the various aspects, the core layer and the skin layer can each be from 5 to 15 percent of the thickness of the MDO-PE film and the sub-skin layer is 70 to 90 percent of the thickness of the MDO-PE film, where the core layer, the sub-skin layer and the skin layer provide 100 percent of the thickness of the MDO-PE film. With respect to the physical properties, the MDO-PE film can exhibit a machine direction 2% secant modulus of 1,000 MPa or more when measured according to ASTM D882. The MDO-PE film of the present disclosure can have a haze 10% or less, where the MDO-PE film preferably has a haze of 5 to 6% as measured according to ASTM D 1003.

The MDO-PE film of the present disclosure can be oriented at a temperature of 115° C. to 130° C. in the machine direction at a draw ratio of 4.5:1 to 7.5:1. The MDO-PE film can further be formed into a laminate, where the laminate includes a first of the MDO-PE film according to the present disclosure and a second of the MDO-PE film according to the present disclosure, where the skin layers (b) of the first and second MDO-PE films are outer layers, where the core layer (c) of the first and second MDO-PE films are sealed to each other, and where the first MDO-PE film and the second MDO-PE film are formed from a single blown film.

The present disclosure further includes a method of forming the MDO-PE film of the present disclosure. For the various aspects, the method includes extruding a film having (a) the core layer (b) the skin layer and (c) the sub-skin layer in-between and in contact with the core layer and the skin layer, all as described herein, where each value for the density, peak melting point and percent crystallinity by weight increases from the core layer to the sub-skin layer and from the sub-skin layer to the skin layer and where the ratio of the percent crystallinity by weight of the core layer to the skin layer has a value of 0.25 to 0.91 and a ratio of the peak melting point of the core layer to the skin layer, each expressed in the Kelvin temperature scale, has a value of 0.870 to 0.990; and orienting the film in a machine direction at a temperature of 115° C. to 130° C. in the machine direction at a draw ratio of 4.5:1 to 7.5:1 to form the MDO-PE film. For the various aspects, the temperature of orienting the film in the machine direction is within 7° C. of the peak melting point of the core layer.

Embodiments of the present disclosure also provide for articles (e.g., flexible packages, pouches, stand-up pouches, etc.) formed from the MDO-PE film disclosed herein. For example, the MDO-PE film of the present disclosure can be used in forming a food package, where the food package comprises the MDO-PE film as described herein.

These and other embodiments are described herein in more detail.

DETAILED DESCRIPTION

Figure 1:
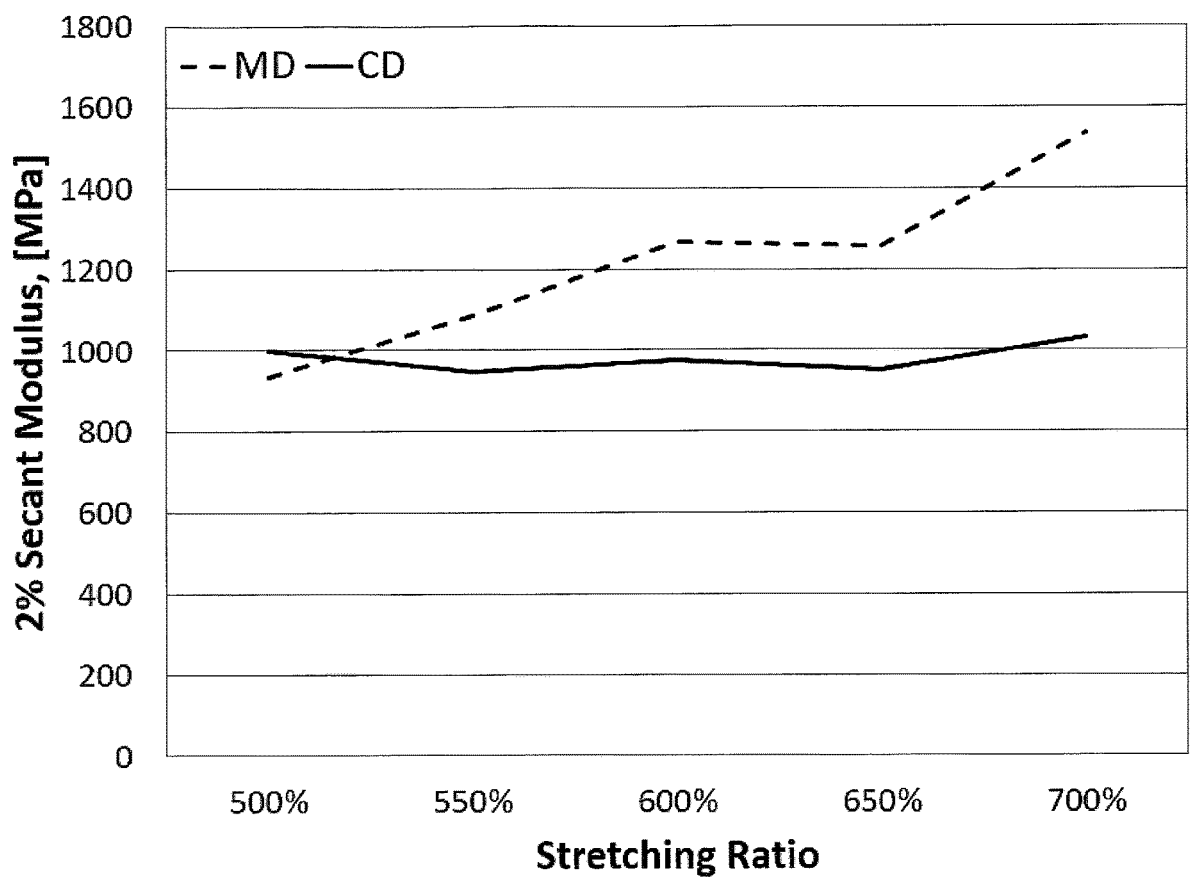
FIG. 1 provides 2% Secant Modulus values (MPa) for the MDO-PE film of the present disclosure seen in Table 2 of the Examples as a function of the stretching ratio.

Unless specified otherwise herein, percentages are weight percentages (wt. %) and temperatures are in ° C.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

Trace amounts of impurities may be incorporated into and/or within the polymer. The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

Polyethylene" or "ethylene-based polymer" shall mean polymers comprising a majority amount (greater than 50 mol. %) of units which have been derived from ethylene monomer. This includes polyethylene homopolymers, ethylene/α-olefin interpolymers, and ethylene/α-olefin copolymers. Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); High Density Polyethylene (HDPE); Enhanced Polyethylene; polyethylene elastomers; and polyethylene plastomers. These polyethylene materials are generally known in the art;

however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm³.

The term "LLDPE", includes both resin made using the traditional Ziegler-Natta catalyst systems as well as single-site catalysts, including, but not limited to, bis-metallocene catalysts (sometimes referred to as "m-LLDPE"), constrained geometry catalysts, and molecular catalysts, and includes linear, substantially linear or heterogeneous polyethylene copolymers or homopolymers. LLDPEs contain less long chain branching than LDPEs and includes the substantially linear ethylene polymers which are further defined in U.S. Pat. No. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.935 g/cm3. "MDPE" is typically made using chromium or Ziegler-Natta catalysts or using single-site catalysts including, but not limited to, bis-metallocene catalysts, constrained geometry catalysts, and molecular catalysts, and typically have a molecular weight distribution ("MWD") greater than 2.5.

The term "HDPE" refers to polyethylenes having densities greater than about 0.935 g/cm³, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.870 to 0.912 g/cm³, which are generally prepared with Ziegler-Natta catalysts, chrome catalysts, or single-site catalysts including, but not limited to, bis-metallocene catalysts and constrained geometry catalysts.

"Multimodal" means resin compositions which can be characterized by having at least two distinct peaks in a GPC chromatogram showing the molecular weight distribution. Multimodal includes resins having two peaks as well as resins having more than two peaks. Multimodal resins generally have a MWD (as defined herein) of greater than 6.0. Related thereto, multimodal resins also generally have I10/I2 values greater than 10. In contrast, the term "unimodal" refers to resin compositions which can be characterized by having one peak in a GPC chromatogram showing the molecular weight distribution. Unimodal resins generally have a MWD of 6.0 or less and I10/I2 values of 12 or less.

Certain polymers are characterized as being prepared in the presence of a "single site catalyst" or as being "single-site catalyzed." Three major families of high efficiency single-site catalysts (SSC) have been commercially used for the preparation of polyethylene copolymers. These are bis-cyclopentadienyl single-site metallocene catalyst (also known as a Kaminsky catalyst), a half sandwich, constrained geometry mono-cyclopentadienyl single-site catalyst (known as a Constrained Geometry Catalyst, CGC, under the trademark of INSITE™ technology by The Dow Chemical Company), and post-metallocene (molecular) catalysts. It should be understood that polymers characterized as being prepared in the presence of a single-site catalyst or as single-site catalyzed were prepared in the presence of one or more of such catalysts.

Unless otherwise indicated herein, the following analytical methods are used in the describing aspects of the present disclosure:

"Density" is determined in accordance with ASTM D792.

"Melt index": Melt indices I2 (or 12) and I10 (or 110) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

"Peak melting point" is determined by a Differential Scanning Calorimeter (DSC) where the film is conditioned at 230° C. for 3 minutes prior to cooling at a rate of 10° C. per minute to a temperature of −40° C. After the film is kept at −40° C. for 3 minutes, the film is heated to 200° C. at a rate of 10° C. per minute.

"VICAT softening point" is measured according to ASTM D 1525.

"Percent crystallinity by weight" is calculated according to Equation 1:

$$\text{Crystallinity (wt. \%)} = \Delta H/\Delta Ho \times 100\%, \quad \text{(Eq. 1)}$$

where the heat of fusion ($\Delta H$) is divided by the heat of fusion for the perfect polymer crystal ($\Delta Ho$) and then multiplied by 100%. For ethylene crystallinity, the heat of fusion for a perfect crystal is taken to be 290 J/g. For example, an ethylene-octene copolymer which upon melting of its polyethylene crystallinity is measured to have a heat of fusion of 29 J/g; the corresponding crystallinity is 10 wt. %. For propylene crystallinity, the heat of fusion for a perfect crystal is taken to be 165 J/g. For example, a propylene-ethylene copolymer which upon melting of its propylene crystallinity is measured to have a heat of fusion of 20 J/g; the corresponding crystallinity is 12.1 wt. %. "Heat of fusion" is obtained using a DSC thermogram obtained by model Q1000 DSC from TA Instruments, Inc. (New Castle, Del.).

Polymer samples are pressed into a thin film at an initial temperature of 190° C. (designated as the "initial temperature"). About 5 to 8 mg of sample is weighed out and placed in the DSC pan. The lid is crimped on the pan to ensure a closed atmosphere. The DSC pan is placed in the DSC cell and then heated at a rate of about 100° C./minute to a temperature (To) of about 60° C. above the melt temperature of the sample. The sample is kept at this temperature for about 3 minutes. Then the sample is cooled at a rate of 10° C./minute to −40° C. and kept isothermally at that temperature for 3 minutes. The sample is then heated at a rate of 10° C./minute until complete melting. Enthalpy curves resulting from this experiment are analyzed for peak melt temperature, onset and peak crystallization temperatures, heat of fusion and heat of crystallization, and any other DSC analyses of interest.

The term molecular weight distribution or "MWD" is defined as the ratio of weight average molecular weight to number average molecular weight (MW/Mn). Mw and Mn are determined according to methods known in the art using conventional gel permeation chromatography (GPC).

2% secant modulus is measured according to ASTM D882.

Elmendorf tear strength is measured according to ASTM D1922.

Additional properties and test methods are described further herein.

The present disclosure provides for a new machine direction oriented all polyethylene flexible film that provide significant down gauging while providing desirable mechanical properties, as are set out in the present disclosure. As discussed herein, the present disclosure provides machine direction oriented polyethylene (MDO-PE) films having a plurality of ethylene-based polymer layers that in some aspects, can be processed (e.g., oriented in the machine direction) more effectively and provide desirable mechanical properties. For example, in some aspects, the MDO-PE films of the present disclosure exhibit improved tear strength after orientation in the machine direction. As another example, in some aspects, MDO-PE films of the present disclosure can exhibit high 2% secant moduli values while maintaining desirable tear strength in the machine direction. As the MDO-PE film is all polyethylene it also can provide for better recyclability while still providing for flexible packaging that can be down gauged (e.g., undergo a high machine direction stretch ratio) while still achieving the desired physical film properties of optical clarity, stiffness and toughness.

As discussed herein, the MDO-PE films of the present disclosure include (a) a core layer comprising a first ethylene-based polymer; (b) a skin layer comprising a second ethylene-based polymer; and (c) a sub-skin layer in-between and in contact with the core layer and the skin layer, the sub-skin layer comprising a third ethylene-based polymer. Each of the first ethylene-based polymer of the core layer, the second ethylene-based polymer of the skin layer and the third ethylene-based polymer of the sub-skin layer has a density value, a peak melting point value and percent crystallinity by weight value, where each value for the density, peak melting point and percent crystallinity by weight increases from the core layer to the sub-skin layer and from the sub-skin layer to the skin layer. So, the density of the second ethylene-based polymer of the skin layer is greater than the density of the third ethylene-based polymer of the sub-skin layer, which in turn in greater than the density of the first ethylene-based polymer of the core layer.

With respect to the percent crystallinity by weight and the peak melting point values, the MDO-PE film of the present disclosure has a ratio of the percent crystallinity by weight of the core layer to the skin layer with a value of 0.25 to 0.91 and a ratio of the peak melting point of the core layer to the skin layer with a value of 0.870 to 0.990. The ratio of the peak melting point of the core layer to the skin layer provided throughout this disclosure and claims is calculated using the peak melting point values for each of the skin layer and the core layer expressed in the Kelvin temperature scale. All individual values and subranges from 0.25 to 0.91 for the ratio of the percent crystallinity by weight of the core layer to the skin layer and 0.870 to 0.990 for the ratio of the peak melting point of the core layer to the skin layer are included herein and disclosed herein; for example, the ratio of the percent crystallinity by weight of the core layer to the skin layer can be from a lower limit of 0.25, 0.30, 0.35 or 0.40 to an upper limit of 0.75, 0.80, 0.85 or 0.91 and the ratio of the peak melting point of the core layer to the skin layer can be from a lower limit of 0.870, 0.880, 0.892 or 0.906 to an upper limit of 0.946, 0.955, 0.973 or 0.990.

These gradients of the density, the peak melting point and the percent crystallinity by weight values, as discussed herein, across the MDO-PE films of the present disclosure help to provide several surprising results. For example, in the context of machine direction orientation of the MDO-PE films of the present disclosure the core layer having the lowest density relative to the sub-skin (next lowest density of the MDO-PE film) and the skin layer (the highest density of the MDO-PE film) allows for the possibility to reach stretching ratios that would not be possible with MDO-PE films having the same density for each of the individual layers. The progressive higher density in the sub-skin and skin layer, relative the core layer, also allows for a higher bending stiffness as would be possible with MDO-PE films having the same density for each of the individual layers. Finally, the higher temperature resistance of the skin layer, afforded by the percent crystallinity by weight, allows for a wider stretch temperature and stretch ratio in producing the MDO-PE film of the present disclosure.

As discussed, the present disclosure provides for a MDO-PE film having the core layer comprising the first ethylene-based polymer; the skin layer comprising the second ethylene-based polymer; and the sub-skin layer in-between and in contact with the core layer and the skin layer, the sub-skin layer comprising the third ethylene-based polymer. The core layer comprising the first ethylene-based polymer has a density of 0.870 g/cm$^3$ to 0.920 g/cm$^3$ measured according to ASTM D 792, a peak melting point of 82 to 126° C. and a percent crystallinity by weight of 15 to 30 calculated according to Equation 1 as provided herein. The skin layer comprising the second ethylene-based polymer has a density of 0.940 g/cm$^3$ to 0.965 g/cm$^3$ measured according to ASTM D 792, a peak melting point of 130 to 135° C. and a percent crystallinity by weight of 30 to 80 calculated according to Equation 1 as provided herein. The sub-skin layer comprising the third ethylene-based polymer has a density of 0.920 g/cm$^3$ to 0.950 g/cm$^3$ measured according to ASTM D 792, a peak melting point of 125 to 130° C. and a percent crystallinity by weight of 40 to 65 calculated according to Equation 1 as provided herein. For the various embodiments, each value for the density, peak melting point and percent crystallinity by weight increases from the core layer to the sub-skin layer and from the sub-skin layer to the skin layer, and a ratio of the percent crystallinity by weight of the core layer to the skin layer has a value of 0.25 to 0.91 and a ratio of the peak melting point of the core layer to the skin layer, each expressed in the Kelvin temperature scale, has a value of 0.870 to 0.990.

In more specific aspects of the present disclosure, the core layer has a density of 0.870 g/cm$^3$ to 0.890 g/cm$^3$ measured according to ASTM D 792; the skin layer has a density of 0.940 g/cm$^3$ to 0.950 g/cm$^3$ measured according to ASTM D 792 and the sub-skin layer has a density of 0.930 g/cm$^3$ to 0.940 g/cm$^3$ measured according to ASTM D 792. More preferably, the core layer has a density of 0.875 g/cm$^3$ to 0.885 g/cm$^3$ measured according to ASTM D 792; the skin layer has a density of 0.945 g/cm$^3$ to 0.950 g/cm$^3$ measured according to ASTM D 792 and the sub-skin layer has a density of 0.935 g/cm$^3$ to 0.940 g/cm$^3$ measured according to ASTM D 792. For the various aspects, ratios and relationships of the various physical properties of the first ethylene-based polymer, the second ethylene-based polymer and the third ethylene-based polymer can have predetermined values, as provided herein, that allow for the MDO-PE film of the present disclosure to have the desirable mechanical properties discussed herein. For example, the present disclosure provides for a ratio of the density of the core layer to the skin layer having a value of 0.90 to 0.98.

The present disclosure further provides the MDO-PE film where the ratio of the percent crystallinity by weight of the core layer to the skin layer has a value of 0.5 to 0.8 and the ratio of the peak melting point of the core layer to the skin layer, each expressed in the Kelvin temperature scale, has a value of 0.892 to 0.973. Preferably, the ratio of the percent crystallinity by weight of the core layer to the skin layer has a value of 0.6 to 0.7 and the ratio of the peak melting point of the core layer to the skin layer, each expressed in the Kelvin temperature scale, has a value of 0.906 to 0.946. For the various aspects, from the core layer to the sub-skin layer the value of the crystallinity can increase from 5 to 80 percent and from the sub-skin layer to the skin layer the value can increase from 18 to 32 percent. Preferably, from the core layer to the sub-skin layer the value of the crystallinity can increase from 20 to 60 percent and from the sub-skin layer to the skin layer the value can increase from 25 to 30 percent. In additional aspects of the present disclosure, from the core layer to the sub-skin layer the value of the peak melting point increases from 1.5 to 50 percent and from the sub-skin layer to the skin layer the value increases from 5 to 7 percent. Preferably, from the core layer to the sub-skin layer the value of the peak melting point increases from 20 to 40 percent and from the sub-skin layer to the skin layer the value increases from 6 to 7 percent.

In some embodiments, the MDO-PE film of the present disclosure can have a thickness of 10 to 125 micrometers (μm). Preferably, the MDO-PE film of the present disclosure can have a thickness of 20 to 60 μm. In another preferred embodiment, the MDO-PE film of the present disclosure can have a thickness of 15 to 25 μm. The thickness of the MDO-PE film of the present disclosure can also be greater than 125 μm, is so desired. The MDO-PE films of the present disclosure can comprise three layers. In additional embodiments, the MDO-PE films of the present disclosure can comprise five layers or six layers, even up to nine layers. For the various aspects, the core layer and the skin layer can each be from 5 to 15 percent of the thickness of the MDO-PE film and the sub-skin layer is 70 to 90 percent of the thickness of the MDO-PE film, where the core layer, the sub-skin layer and the skin layer provide 100 percent of the thickness of the MDO-PE film.

With respect to the physical properties, the MDO-PE film can exhibit a machine direction 2% secant modulus of 1,000 MPa or more when measured according to ASTM D882. In some embodiments, the 2% secant modulus can be 1,500 MPa or more when measured according to ASTM D882. The MDO-PE films of the present disclosure, in some embodiments, can be substantially flat. The MDO-PE film of the present disclosure can have a haze 10% or less, where the MDO-PE film preferably has a haze of 5 to 6% as measured according to ASTM D 1003.

Core Layer

In describing that the core layer of the MDO-PE film comprises a first ethylene-based polymer, the term "first" is used to identify the ethylene-based polymer within the context of the other ethylene-based polymers used in forming the MDO-PE film of the present disclosure. For the various embodiments, the "core" layer of the MDO-PE film is at minimum in direct contact with the sub-skin layer of the MDO-PE film of the present disclosure. In addition to being direct contact with the sub-skin layer, the "core" layer of the MDO-PE film can also be in direct contact with itself when a laminate of the MDO-PE film of the present disclosure is formed, as discussed herein.

In some embodiments, the first ethylene-based polymer has a density of 0.870 g/cm$^3$ to 0.920 g/cm$^3$ measured according to ASTM D 792, a peak melting point of 82 to 126° C. and a percent crystallinity by weight of 15 to 30 calculated according to Equation 1 as provided herein. In some embodiments, the first ethylene-based polymer is a single-site catalyzed ultra-low density polyethylene including, but not limited to, bis-metallocene catalysts, constrained geometry catalysts, and post-metallocene (molecular) catalysts. Alternatively, the first ethylene-based polymer is a low density polyethylene or a linear-low density polyethylene formed with traditional Ziegler-Natta catalyst systems as well as single-site catalysts, including, but not limited to, bis-metallocene catalysts, constrained geometry catalysts, and post-metallocene (molecular) catalysts, and includes linear, substantially linear or heterogeneous polyethylene copolymers or homopolymers. In some embodiments, in addition to the single-site catalyst, the first ethylene-based polymer can be prepared with Ziegler-Natta catalysts and/or chrome catalysts, as are known in the art. Examples of first ethylene-based polymer include those commercially available from The Dow Chemical Company under the name ELITE™ including, for example, ELITE™ 5400GS.

All individual values and subranges from 0.870 g/cm$^3$ to 0.920 g/cm$^3$ are included herein and disclosed herein; for example, the density of the first ethylene-based polymer can be from a lower limit of 0.870, 0.875, 0.880 or 0.885 g/cm$^3$ to an upper limit of 0.890, 0.90, 0.910, 0.915, or 0.920 g/cm$^3$. In some embodiments, the first composition preferably has a density from 0.870 to 0.890 g/cm$^3$ and more preferably 0.875 g/cm$^3$ to 0.885 g/cm$^3$. The density values are measured according to ASTM D 792.

All individual values and subranges from the peak melting point of 82 to 126° C. are included herein and disclosed herein; for example, the peak melting point of the first ethylene-based polymer can be from a lower limit of 82, 85, 90, 95 or 100° C. to an upper limit of 105, 110, 115, 120 or 126° C. In some embodiments, the first composition preferably has a peak melting point of 90 to 120° C. and more preferably 95 to 110° C. The peak melting point values are measured as described herein.

All individual values and subranges from the percent crystallinity by weight of 15 to 30 calculated according to Equation 1 as provided herein are included herein; for example percent crystallinity by weight for the first ethylene-based polymer can be from a lower limit of 15, 17, 19 or 21 to an upper limit of 23, 25, 27 or 30. In some embodiments, the first composition preferably has a percent crystallinity by weight of 17 to 27 and more preferably 19 to 25. The percent crystallinity by weight is calculated according to Equation 1 as provided herein.

The core layer of the MDO-PE film can, in various embodiments, be a blown film where the core layer of the MDO-PE film is an inner surface layer that is allowed to collapse on itself such that the (a) a core layer, (c) sub-skin layer, (b) a skin layer (A/C/B) structured blown film becomes an B/C/A/A/C/B structured film with A being the core layer, C being the sub-skin layer and B being the skin layer.

For the various embodiments, the first ethylene-based polymer can be a blend of two or more ethylene-based polymers, as provided herein, for the first ethylene-based polymer. For example, the first ethylene-based polymer can be prepared from a blend of an ethylene-based polymer prepared using a single-site catalyst as described above and an ethylene-based polymer prepared using a Ziegler-Natta catalyst. For example, the Ziegler-Natta catalyst can be used to prepare a ULDPE having a density of 0.870 g/cm³ to 0.912 g/cm³, whereas the single-site catalyst can be used to prepare a LDPE having a density of 0.916 to 0.935 g/cm³, where the blend of an ethylene-based polymer are provided in portions so as to provide the first ethylene-based polymer with a density of 0.870 g/cm³ to 0.920 g/cm³ measured according to ASTM D 792, a peak melting point of 82 to 126° C. and a percent crystallinity by weight of 15 to 30 calculated according to Equation 1 as provided herein. For example, the first ethylene-based polymer can comprise greater than 50% by weight of the ULDPE prepared with the Ziegler-Natta catalyst and less than 50% by weight of the LDPE prepared with the single-site catalyst, preferably greater than 60% by weight of the ULDPE prepared with the Ziegler-Natta catalyst and less than 40% by weight of the LDPE prepared with the single-site catalyst, or greater than 65% by weight of the ULDPE prepared with the Ziegler-Natta catalyst and less than 35% by weight of the LDPE prepared with the single-site catalyst. Other blends of two or more of the ethylene-based polymers provided herein can also be provided so as to provide the first ethylene-based polymer with a density of 0.870 g/cm³ to 0.920 g/cm³ measured according to ASTM D 792, a peak melting point of 82 to 126° C. and a percent crystallinity by weight of 15 to 30 calculated according to Equation 1 as provided herein.

Skin Layer

In describing that the skin layer of the MDO-PE film comprises a second ethylene-based polymer, the term "second" is used to identify the ethylene-based polymer within the context of the other ethylene-based polymers used in forming the MDO-PE film of the present disclosure. For the various embodiments, the "skin" layer of the MDO-PE film is in direct contact with the sub-skin layer of the MDO-PE film of the present disclosure, where a major surface of the skin layer forms an external or outer layer of the MDO-PE film that is not in contact with any other polyethylene and/or polyolefin except the sub-skin layer as provided herein.

The skin layer comprising the second ethylene-based polymer has a density of 0.940 g/cm³ to 0.965 g/cm³ measured according to ASTM D 792, a peak melting point of 130 to 135° C. and a percent crystallinity by weight of 30 to 80 calculated according to Equation 1 as provided herein. In some embodiments, the second ethylene-based polymer can be made using traditional Ziegler-Natta catalyst systems as well as single-site catalysts, including, but not limited to, bis-metallocene catalysts, constrained geometry catalysts, and post-metallocene (molecular) catalysts and includes linear, substantially linear or heterogeneous polyethylene copolymers or homopolymers. For example, the second ethylene-based polymer can be made from one or more of a HDPE, a MDPE, a LDPE or combination thereof, where the cited polyethylenes are formed as provided herein. Examples of second ethylene-based polymer include those commercially available from The Dow Chemical Company under the name ELITE™ including, for example, ELITE™ 5960G.

All individual values and subranges from 0.940 g/cm³ to 0.965 g/cm³ are included herein and disclosed herein; for example, the density of the second ethylene-based polymer can be from a lower limit of 0.940, 0.942, 0.945 or 0.947 g/cm³ to an upper limit of 0.950, 0.955, 0.960 or 0.965 g/cm³. In some embodiments, the second composition preferably has a density from 0.940 to 0.950 g/cm³ and more preferably 0.945 g/cm³ to 0.950 g/cm³. The density values are measured according to ASTM D 792.

All individual values and subranges from the peak melting point of 130 to 135° C. are included herein and disclosed herein; for example, the peak melting point of the second ethylene-based polymer can be from a lower limit of 130, 131 or 132° C. to an upper limit of 133, 134 or 135° C. In some embodiments, the second composition preferably has a peak melting point of 131 to 134° C. and more preferably 132 to 133° C. The peak melting point values are measured as described herein.

All individual values and subranges from the percent crystallinity by weight of 30 to 80 calculated according to Equation 1 as provided herein are included herein; for example percent crystallinity by weight for the second ethylene-based polymer can be from a lower limit of 30, 35, 40 or 45 to an upper limit of 65, 70, 75 or 80. In some embodiments, the second composition preferably has a percent crystallinity by weight of 35 to 75 and more preferably 40 to 70. The percent crystallinity by weight is calculated according to Equation 1 as provided herein.

For the various embodiments, the second ethylene-based polymer can be a blend of two or more ethylene-based polymers, as provided herein, for the second ethylene-based polymer. For example, the second ethylene-based polymer can be prepared from a blend of an ethylene-based polymer prepared using a single-site catalyst as described above and an ethylene-based polymer prepared using a Ziegler-Natta catalyst. For example, the Ziegler-Natta catalyst can be used to prepare a HDPE having a density of greater than about 0.935 g/cm³, whereas the single-site catalyst can be used to prepare a LDPE having a density of 0.916 to 0.935 g/cm³, where the blend of an ethylene-based polymer are provided in portions so as to provide the second ethylene-based polymer with a density of 0.940 g/cm³ to 0.965 g/cm³ measured according to ASTM D 792, a peak melting point of 130 to 135° C. and a percent crystallinity by weight of 30 to 80 calculated according to Equation 1 as provided herein. For example, the second ethylene-based polymer can comprise greater than 50% by weight of the HDPE prepared with the Ziegler-Natta catalyst and less than 50% by weight of the LDPE prepared with the single-site catalyst, preferably greater than 60% by weight of the HDPE prepared with the Ziegler-Natta catalyst and less than 40% by weight of the LDPE prepared with the single-site catalyst, or greater than 65% by weight of the HDPE prepared with the Ziegler-Natta catalyst and less than 35% by weight of the LDPE prepared with the single-site catalyst. Other blends of two or more of the ethylene-based polymers provided herein can also be provided so as to provide the second ethylene-based polymer with a density of 0.940 g/cm³ to 0.965 g/cm³ measured according to ASTM D 792, a peak melting point of 130 to 135° C. and a percent crystallinity by weight of 30 to 80 calculated according to Equation 1 as provided herein.

Sub-Skin Layer

The MDO-PE films of the present disclosure each comprise at least sub-skin layer. In describing that the sub-skin layer of the MDO-PE film comprises a third ethylene-based polymer, the term "third" is used to identify the ethylene-based polymer within the context of the other ethylene-based polymers used in forming the MDO-PE film of the present disclosure. The term "sub-skin" layer is used to indicate that the sub-skin layer is in-between and in contact with the core layer and the skin layer. For the various embodiments, more than one of the sub-skin layer can be used in forming the MDO-PE film of the present disclosure. For example, the MDO-PE film of the present disclosure can include a single sub-skin layer or two or more sub-skin layers. In some embodiments, when two or more sub-skin layers are present, each of the sub-skin layers can have the same ethylene-based polymer composition. In other embodiments, when two or more sub-skin layers are present, each of the sub-skin layers can have different ethylene-based polymer compositions or only some of the sub-skin layers can have the same ethylene-based polymer composition.

The sub-skin layer comprising the third ethylene-based polymer has a density of 0.920 g/cm$^3$ to 0.950 g/cm$^3$ measured according to ASTM D 792, a peak melting point of 125 to 130° C. and a percent crystallinity by weight of 40 to 65 calculated according to Equation 1 as provided herein. In some embodiments, the third ethylene-based polymer can be made using traditional Ziegler-Natta catalyst systems as well as single-site catalysts, including, but not limited to, bis-metallocene catalysts, constrained geometry catalysts, and post-metallocene (molecular) catalysts, and includes linear, substantially linear or heterogeneous polyethylene copolymers or homopolymers. For example, the third ethylene-based polymer can be made from one or more of a HDPE, a MDPE, a LLDPE, a LDPE or combination thereof, where the cited polyethylenes are formed as provided herein. Examples of third ethylene-based polymer include those commercially available from The Dow Chemical Company under the name ELITE™ including, for example, ELITE™ 5940ST and INNATE™ including, for example, INNATE™ ST70.

All individual values and subranges from 0.920 g/cm$^3$ to 0.950 g/cm$^3$ are included herein and disclosed herein; for example, the density of the third ethylene-based polymer can be from a lower limit of 0.920, 0.925, 0.930 or 0.935 g/cm$^3$ to an upper limit of 0.935, 0.940, 0.945 or 0.950 g/cm$^3$. In some embodiments, the third composition preferably has a density from 0.930 to 0.940 g/cm$^3$ and more preferably 0.935 g/cm$^3$ to 0.940 g/cm$^3$. The density values are measured according to ASTM D 792.

All individual values and subranges from the peak melting point of 125 to 130° C. are included herein and disclosed herein; for example, the peak melting point of the third ethylene-based polymer can be from a lower limit of 125, 126 or 127° C. to an upper limit of 128, 129 or 130° C. In some embodiments, the second composition preferably has a peak melting point of 126 to 129° C. and more preferably 127 to 128° C. The peak melting point values are measured as described herein.

All individual values and subranges from the percent crystallinity by weight of 30 to 80 calculated according to Equation 1 as provided herein are included herein; for example percent crystallinity by weight for the second ethylene-based polymer can be from a lower limit of 30, 35, 40 or 45 to an upper limit of 65, 70, 75 or 80. In some embodiments, the second composition preferably has a percent crystallinity by weight of 35 to 75 and more preferably 40 to 70. The percent crystallinity by weight is calculated according to Equation 1 as provided herein.

For the various embodiments, the third ethylene-based polymer can be a blend of two or more ethylene-based polymers, as provided herein, for the third ethylene-based polymer. For example, the third ethylene-based polymer can be prepared from a blend of an ethylene-based polymer prepared using a single-site catalyst as described above and an ethylene-based polymer prepared using a Ziegler-Natta catalyst. For example, the Ziegler-Natta catalyst can be used to prepare a HDPE having a density of greater than about 0.935 g/cm$^3$, whereas the single-site catalyst can be used to prepare a LDPE having a density of 0.916 to 0.935 g/cm$^3$, where the blend of an ethylene-based polymer are provided in portions so as to provide the third ethylene-based polymer with a density of 0.920 g/cm$^3$ to 0.950 g/cm$^3$ measured according to ASTM D 792, a peak melting point of 125 to 130° C. and a percent crystallinity by weight of 40 to 65 calculated according to Equation 1 as provided herein. For example, the third ethylene-based polymer can comprise greater than 50% by weight of the HDPE prepared with the Ziegler-Natta catalyst and less than 50% by weight of the LDPE prepared with the single-site catalyst, preferably greater than 60% by weight of the HDPE prepared with the Ziegler-Natta catalyst and less than 40% by weight of the LDPE prepared with the single-site catalyst, or greater than 65% by weight of the HDPE prepared with the Ziegler-Natta catalyst and less than 35% by weight of the LDPE prepared with the single-site catalyst. Other blends of two or more of the ethylene-based polymers provided herein can also be provided so as to provide the third ethylene-based polymer with a density of 0.920 g/cm$^3$ to 0.950 g/cm$^3$ measured according to ASTM D 792, a peak melting point of 125 to 130° C. and a percent crystallinity by weight of 40 to 65 calculated according to Equation 1 as provided herein.

MDO-Films

A variety of MDO-PE films can be formed in accordance with the teachings of the present disclosure. Certain combinations of polyethylene-based polymers, as described herein, provide films having certain desirable properties. The MDO-PE films have particularly desirable properties when oriented only in the machine direction to provide MDO-PE films of the present disclosure. The MDO-PE film can be formed according to any method known in the art. The combinations of ethylene-based polymers described herein are particularly well-suited for formation of the MDO-PE films using blown film processes. When a blown film process is used, the blown MDO-PE film can be formed conventionally (e.g., slit and opened prior to winding), or the blown MDO-PE film can be allowed to collapse so that the interior layer (the core layer as described herein) can laminate to itself to form a multilayer film that is twice as thick. In other words, a blown MDO-PE film process can be configured to form an (b)/(c)/(a) multilayer film, with (a) corresponding to the core layer, (b) corresponding to the skin layer and (c) corresponding to the sub-skin layer in contact and between (b) and (a), each as provided herein. In a typical process, the multilayer film would have an (b)/(c)/(a) structure. However, if the MDO-PE film were allowed to collapse on itself, the multilayer MDO-PE film would have a laminate structure (e.g., having an (b)/(c)/(a)/(a)/(c)/(b) structure). For example, the MDO-PE film can be formed into a laminate, where the laminate includes a first of the MDO-PE film according to the present disclosure and a second of the MDO-PE film according to the present disclosure, where the skin layers (b) of the first and second MDO-PE films are outer layers, where the core layer (c) of the first and second MDO-PE films are sealed to each other, and where the first MDO-PE film and the second MDO-PE film are formed from a single blown film. In some embodiments, two or more MDO-PE films as described herein are sealed to each other to form the laminate. In other embodiments, a laminate can be formed from a single blown MDO-PE film. In such embodiments, the inner surface of the blown MDO-PE film can collapse and seal on itself to form a laminate having a thickness approximately twice the thickness of the blown MDO-PE film prior to forming the laminate. Regardless of the scenario, the MDO-PE film is oriented in the machine direction to provide the MDO-PE film of the present disclosure. The collapsing method may be desirable in certain situations such as when thicker films are desired. The collapsing method, in some embodiments, can also be advantageous as it facilitates the manufacture of symmetric films oriented in the machine direction without curling.

The collapsing method, in some embodiments, can also allow for faster cooling as some cooling of the thinner MDO-PE film occurs prior to collapsing into the thicker MDO-PE film. Another advantage of the collapsing method is that it can provide enhanced barrier properties as a barrier layer (e.g., an oxygen barrier layer or water vapor barrier layer) can be included in the blown MDO-PE film, and then duplicated when the blown MDO-PE film collapses (e.g., a single barrier layer in the blown film becomes two barrier layers upon collapse). The number of layers in MDO-PE films can depend on a number of factors including, for example, the desired properties of the film, the end use application for the film, the desired polymers to be used in each layer, the desired thickness of the film, whether the MDO-PE film is formed by collapsing a blown MDO-PE film, and others.

The machine direction oriented films of the present disclosure comprise at least three layers. Typical MDO-PE films made with or without collapsing can have up to 9 layers, though collapsing a multilayer blown MDO-PE film can result in more layers (e.g., a 9 layer blown film collapses to form 18 layers). In some embodiments, MDO-PE laminates of the present disclosure can have a thickness of 20 to 250 μm, of 20 to 100 μm, of 40 to 100 μm, or of 20 to 50 μm.

In an aspect, the present disclosure includes the method of forming the MDO-PE film of the present disclosure, which includes extruding a film having (a) the core layer (b) the skin layer and (c) the sub-skin layer in-between and in contact with the core layer and the skin layer, all as described herein, where each value for the density, peak melting point and percent crystallinity by weight increases from the core layer to the sub-skin layer and from the sub-skin layer to the skin layer and where the ratio of the percent crystallinity by weight of the core layer to the skin layer has a value of 0.25 to 0.91 and a ratio of the peak melting point of the core layer to the skin layer, each expressed in the Kelvin temperature scale, has a value of 0.870 to 0.990; and orienting the film in a machine direction at a temperature of 115° C. to 130° C. in the machine direction at a draw ratio of 4.5:1 to 7.5:1 to form the MDO-PE film. The MDO-PE films can be oriented in the machine direction only using techniques known to those of skill in the art, such as a tenter frame process.

Preferably, the MDO-PE film of the present disclosure can be oriented at a temperature of 115° C. to 130° C. in the machine direction at a draw ratio of 5.5:1 to 7:1. Preferably, the temperature of orienting the film in the machine direction is within 7° C. of the peak melting point of the core layer. The temperature of 115° C. to 130° C. for orienting the MDO-PE film in the machine direction is possible because of the high relative skin layer density and associated melting temperature.

The MDO-PE film can further be formed into a laminate, as discussed herein, where the laminate includes a first of the MDO-PE film according to the present disclosure and a second of the MDO-PE film according to the present disclosure, where the skin layers (b) of the first and second MDO-PE films are outer layers, where the core layer (c) of the first and second MDO-PE films are sealed to each other, and where the first MDO-PE film and the second MDO-PE film are formed from a single blown film.

Articles

Embodiments of the present disclosure also provide articles formed from any of the MDO-PE films described herein. Examples of such articles can include flexible packages, pouches, stand-up pouches, and pre-made packages or pouches. Such articles can be formed using techniques known to those of skill in the art in view of the teachings herein.

For example, thin gauge (e.g., 25-35 micron), single films having very good optics, stiffness, and sealability, according to some embodiments of the present disclosure, can be useful in pouches made with form/fill/seal processing equipment. Such pouches can useful for powder and grain pouches holding ~250 grams to 1 kilogram. The orientation of the films of the present disclosure in the machine direction is believed to provide a combination of stiffness, toughness, and optics that is advantageous over conventional blown films.

MDO-PE films having high stiffness and clarity, according to some embodiments of the present disclosure, can be laminated to one another to provide a laminate formed entirely from polyethylene. As another example, a uniaxially oriented film having high stiffness and clarity, according to some embodiments of the present disclosure, can be laminated to a stiff, HDPE-rich blown film, and the laminate can be used to form a stand-up pouch formed entirely from polyethylene.

As another example, MDO-PE films having high stiffness, high optics, and good tear strength, in some embodiments can be used in forming a food package, where the food package comprises the MDO-PE film as described herein. Some embodiments of the disclosure will now be described in detail in the following Examples.

EXAMPLES

Prepare blown multilayer film structures for orientation in the machine direction as follows. Table 1 provides the polyethylene components used in the layers of the Example (EX) and Comparative Example (CE) films.

TABLE 1

| | | | | | | |
|---|---|---|---|---|---|---|
| | | Polyethylene Components | | | | |
| Material | Source | Polyolefin | Density (g/cm³), ASTM D 792 | Peak Melting Point (° C.), DSC Method | Percent Crystallinity by Weight (Equation 1) | Haze, %, ASTM D 1003 |
| Elite ™ 5960G | The Dow Chemical Company (TDCC) | PE Copolymer Resin | 0.962 | 132.6 | 76.6 | 42 |

TABLE 1-continued

| | | | Polyethylene Components | | | |
|---|---|---|---|---|---|---|
| Material | Source | Polyolefin | Density (g/cm³), ASTM D 792 | Peak Melting Point (° C.), DSC Method | Percent Crystallinity by Weight (Equation 1) | Haze, %, ASTM D 1003 |
| Elite ™ 5940ST | TDCC | PE Copolymer Resin | 0.941 | 125.58 | 62.2 | 30 |
| Elite ™ 5400GS | TDCC | PE Copolymer Resin | 0.916 | 122.3 | 42.3 | 9.5 |
| Affinity EG 8100 | TDCC | PE Copolymer Resin | 0.870 | 82.4 | 32.5 | N/A |
| INNATE ™ ST70 | TDCC | PE Copolymer Resin | 0.926 | 124.0 | 51.8 | 19.5 |

Prepare the blown multilayer film structures of the present EX and CE using a VAREX II Blown film extrusion line (Windmöeller & Höelscher Corporation) equipped with 5-layer 45 centimeter (cm) head and five extruders with the following diameters 60 cm/70 cm/105 cm/70 cm/60 m. Typical melt temperatures for LLDPE of 205° C. have been used as well as a blow-up ratio of 2.5 and operating output of 400 kg/h, with linear speeds of 30 to 40 meters/minute.

MDO Process

Operate the machine direction orientation (MDO) unit (Windmoeller & Hoelscher MDO-M) with the following temperature profile 70° C./105° C./115° C./105° C./70° C. for the Preheat 1/Preheat 2/Stretching/Annealing/Cooling rollers respectively with stretching ratios of 1:4.5 to 1:7.5.

Example 1 (EX 1)

Table 2 shows the film structure for EX 1. EX 1 has an (b)/(c)/(a)/(c)/(b) film structure with the layers shown in Table 2.

TABLE 2

| | Layers of EX 1 | | |
|---|---|---|---|
| Layer | Composition | Layer Density, g/cm³ | Layer Thickness/ Total % Film Thickness |
| Skin layer - (b) | Elite ™ 5960G, 100 wt. % | 0.962 | 4 µm/29.6% |
| Sub-Skin Layer - (c) | Elite ™ 5940ST, 100 wt. % | 0.941 | 7 µm/51.9% |
| Core Layer - (a) | Elite ™ 5400GS, 100 wt. % | 0.916 | 5 µm/18.5% |

Produce the coextruded (b)/(c)/(a)/(c)/(b) film structure of EX 1 at a film thickness of 122 microns (µm) on the VAREX II Blown film extrusion line using the layers set forth in Table 2. The blow up ratio used is 2.5:1. The layer distribution used is seen in Table 2. The film of EX 1 has an initial thickness of about 122 microns. Stretch the film of EX 1 at 115° C. and at draw ratios of 5:1, 5.5:1, 6:1, 6.5:1 and 7:1 to obtain the films as shown in Table 3:

TABLE 3

| | 5:1 Draw Ratio (µm) | 5.5:1 Draw Ratio (µm) | 6:1 Draw Ratio (µm) | 6.5:1 Draw Ratio (µm) | 7:1 Draw Ratio (µm) |
|---|---|---|---|---|---|
| Thickness (µm) | 27 µm | 25 µm | 23 µm | 20 µm | 18 µm |

The films are substantially flat and are quite stiff with the 18 micron film having lower haze and higher gloss. Measurements are taken to evaluate the Example 1 films orientation performance in both the machine direction (MD) and the transvers direction (CD). FIG. 1 provides 2% Secant Modulus values (MPa) for the films of Table 2 as a function of the stretching ratio.

Example 2 (EX 2)

Table 4 shows the film structure for EX 2. EX 2 has a blocked (b)/(c)/(a)/(a)/(c)/(b) film structure with the layers shown in Table 4.

TABLE 4

| | Layers of EX 2 | | |
|---|---|---|---|
| Layer | Composition | Layer Density, g/cm³ | Layer Thickness/ Total % Film Thickness |
| Skin layer - (b) | Elite ™ 5960G, 100 wt. % | 0.962 | 4 µm/29.6% |
| Sub-Skin Layer - (c) | Elite ™ 5940ST, 100 wt. % | 0.941 | 7 µm/51.9% |
| Core Layer - (a) | Elite ™ 5940ST, 80 wt. % + Elite ™ 5400 GS | 0.936 | 5 µm/18.5% |

Figure 2:
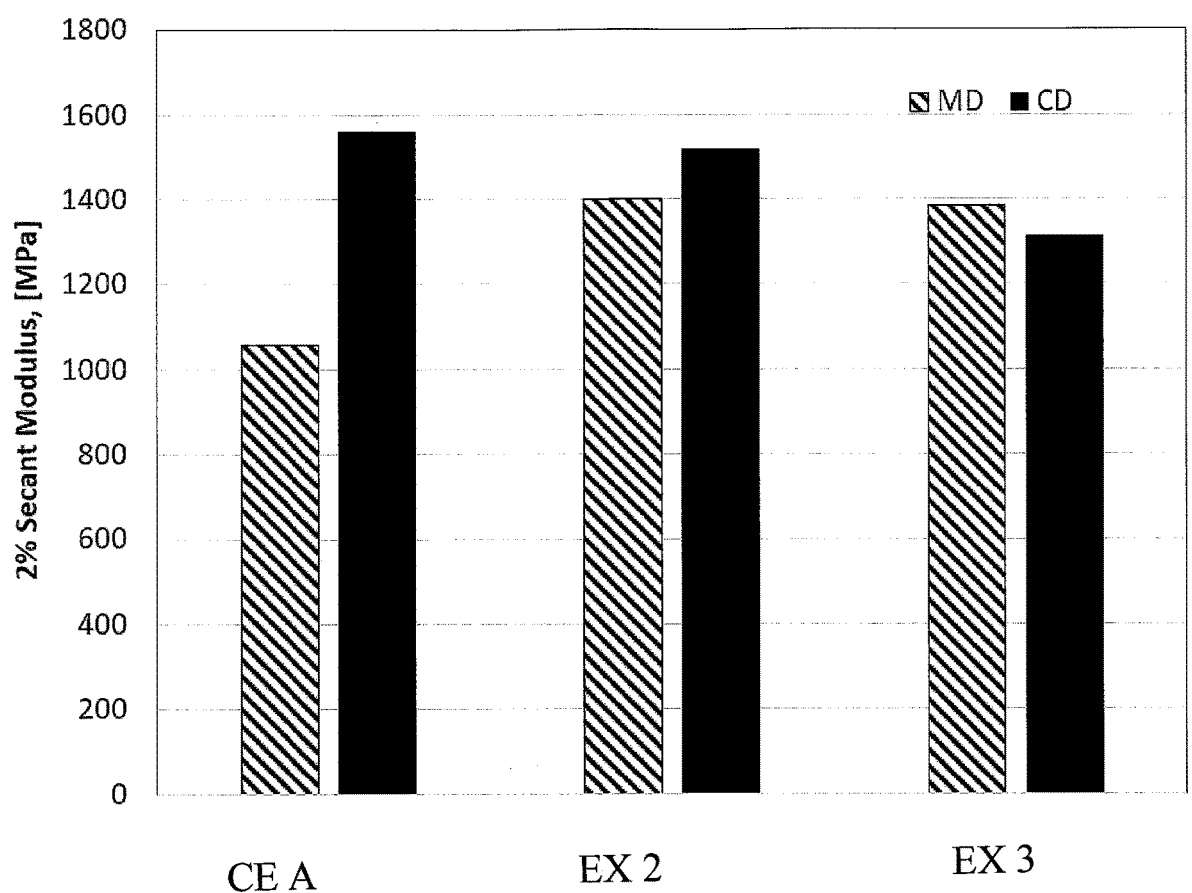
FIG. 2 is a chart showing the results of 2% Secant Modulus (MPa) tests for MDO-PE films of EX 2, EX 3 and CE A in the Examples.

Produce the coextruded (b)/(c)/(a)/(a)/(c)/(b) film structure of EX 2 at a film thickness of 25 microns (µm) on the VAREX II Blown film extrusion line using the layers set forth in Table 4. The blow up ratio used is 2.5:1. The layer distribution used is seen in Table 4. The film of EX 2 has an initial thickness of about 120 microns. Stretch the film of EX 2 at 115° C. and at draw ratios of 5.5:1. The film of Ex 2 is substantially flat and quite stiff with the 25 micron film having lower haze and higher gloss. Measurements are taken to evaluate the film of EX 2 orientation performance in both the machine direction (MD) and the transvers direction (CD). FIG. 2 provides 2% Secant Modulus values (MPa) for the film of EX 2 for both the MD and CD.

Example 3 (EX 3)

Table 5 shows the film structure for EX 3. EX 3 has a blocked (b)/(c)/(a)/(a)/(c)/(b) film structure with the layers shown in Table 5.

TABLE 5

Layers of EX 3

| Layer | Composition | Layer Density, g/cm³ | Layer Thickness/ Total % Film Thickness |
|---|---|---|---|
| Skin layer - (b) | Elite ™ 5960G, 100 wt. % | 0.962 | 4 μm/29.6% |
| Sub-Skin Layer - (c) | Elite ™ 5940ST, 80 wt. % + INNATE ™ ST70, 20 wt. % | 0.941 | 7 μm/51.9% |
| Core Layer - (a) | Elite ™ 5400GS, 100 wt. % | 0.916 | 5 μm/18.5% |

Produce the coextruded (b)/(c)/(a)/(a)/(c)/(b) film structure of EX 3 at a film thickness of 25 microns (μm) on the VAREX II Blown film extrusion line using the layers set forth in Table 5. The blow up ratio used is 2.5:1. The layer distribution used is seen in Table 5. The film of EX 3 has an initial thickness of about 120 microns. Stretch the film of EX 3 at 115° C. and at draw ratios of 5.5:1. The film of Ex 3 is substantially flat and quite stiff with the 25 micron film having lower haze and higher gloss. Measurements are taken to evaluate the film of EX 3 orientation performance in both the machine direction (MD) and the transvers direction (CD). FIG. 2 provides 2% Secant Modulus values (MPa) for the film of EX 3 for both the MD and CD.

Comparative Example A (CE A)

Table 6 shows the film structure for CE A. CE A has a blocked (b)/(c)/(a)/(a)/(c)/(b) film structure with the layers shown in Table 6.

TABLE 6

Layers of CE A

| Layer | Composition | Layer Density, g/cm³ | Layer Thickness/ Total % Film Thickness |
|---|---|---|---|
| Skin layer - (b) | Elite ™ 5940ST, 100 wt. % | 0.941 | 4 μm/29.6% |
| Sub-Skin Layer - (c) | Elite ™ 5940ST, 100 wt. % | 0.941 | 7 μm/51.9% |
| Core Layer - (a) | Elite ™ 5940ST, 100 wt. % | 0.941 | 5 μm/18.5% |

Figure 3:
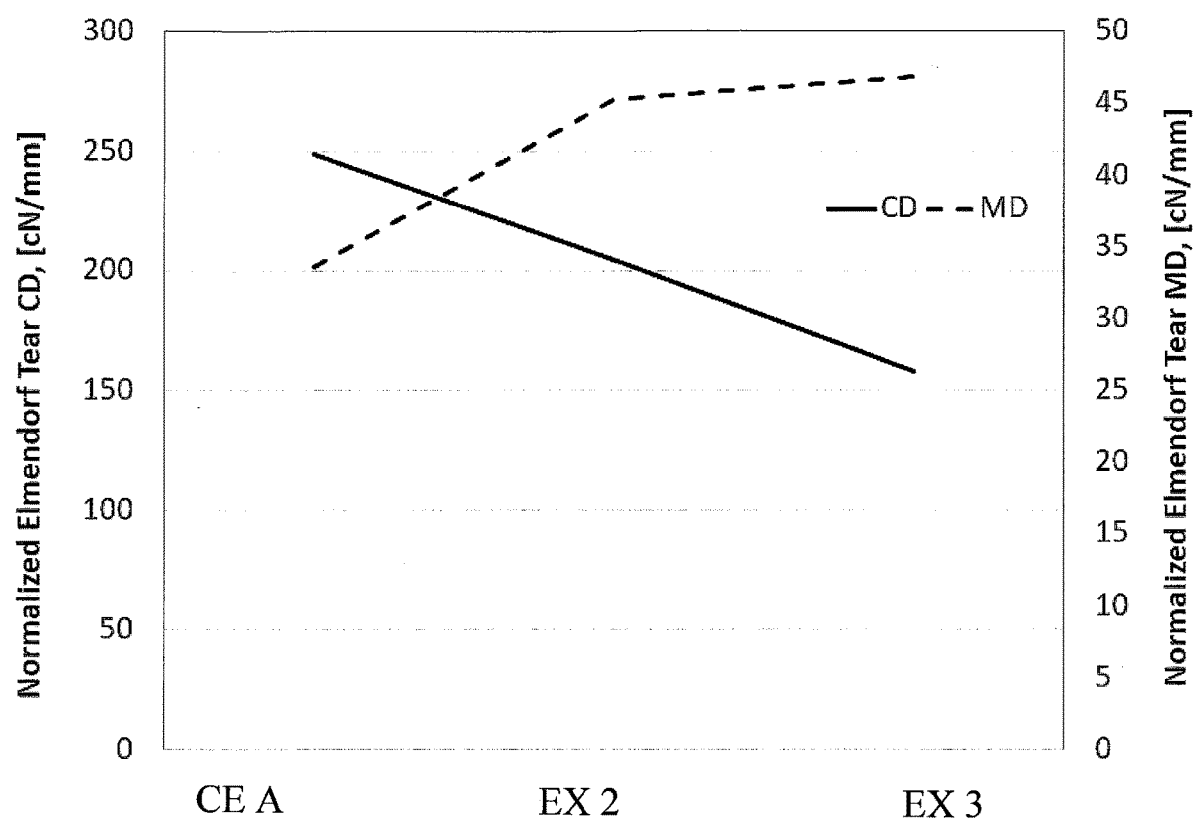
FIG. 3 is a graph showing data measured using the films of EX 2, EX 3 and CE A that illustrates improvements in tear resistance for the MDO-PE films of the present disclosure.
Figure 4:
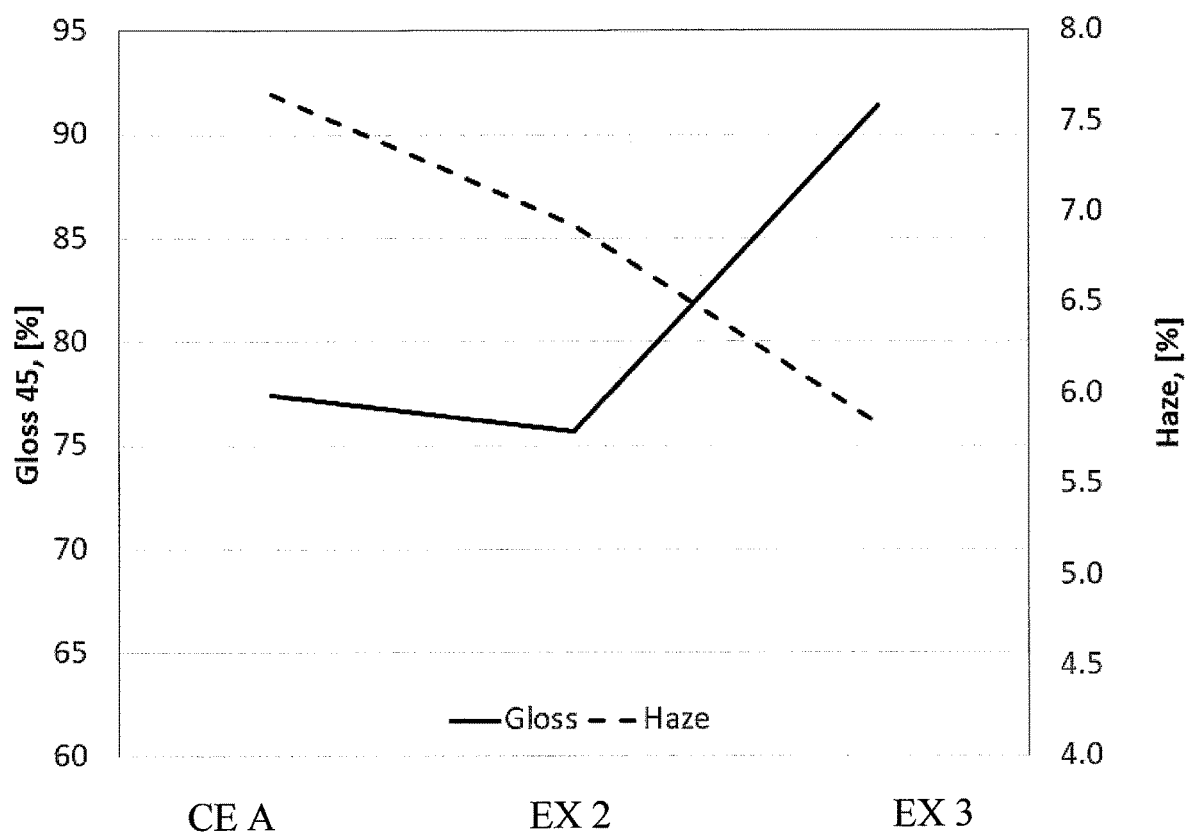
FIG. 4 is a graph showing data measured using the films of EX 2, EX 3 and CE A that illustrates improvements in gloss and haze for the MDO-PE films of the present disclosure.

Produce the coextruded (b)/(c)/(a)/(a)/(c)/(b) film structure of CE A at a film thickness of 120 microns (μm) on the VAREX II Blown film extrusion line using the layers set forth in Table 6. The blow up ratio used is 2.5:1. The layer distribution used is seen in Table 6. The film of CE A has an initial thickness of about 120 microns. Stretch the film of CE A at 115° C. and at draw ratios of 5.5:1. The film of CE A is substantially flat and quite stiff with the 25 micron film having 5.7% haze and 92% gloss. Measurements are taken to evaluate the film of CE A orientation performance in both the machine direction (MD) and the transvers direction (CD). FIG. 2 provides 2% Secant Modulus values (MPa) for the film of CE A for both the MD and CD. FIG. 3 and FIG. 4 provide data measured using the films of EX 2, EX 3 and CE A that show improvements in tear resistance (increase in MD, decrease in CD) and gloss and haze. Similarly, improvements in gloss and haze are observed for EX 2, EX 3 and CE A as seen in FIGS. 3 and 4. Other mechanical properties such as Elongation at break, as well as Tensile Strength remain essentially the same or exhibit a very slight decrease.

What is claimed is:

1. A machine direction oriented polyethylene film comprising:
    (a) a core layer comprising a first ethylene-based polymer having a density of 0.885 g/cm³ to 0.920 g/cm³ measured according to ASTM D 792, a peak melting point of 82 to 126° C. and a percent crystallinity by weight of 15 to 30 calculated according to Equation 1 as provided herein;
    (b) a skin layer comprising a second ethylene-based polymer having a density of 0.940 g/cm³ to 0.965 g/cm³ measured according to ASTM D 792, a peak melting point of 130 to 135° C. and a percent crystallinity by weight of 30 to 80 calculated according to Equation 1 as provided herein; and
    (c) a sub-skin layer in-between and in contact with the core layer and the skin layer, the sub-skin layer comprising a third ethylene-based polymer having a density of 0.920 g/cm³ to 0.950 g/cm³ measured according to ASTM D 792, a peak melting point of 125 to 130° C. and a percent crystallinity by weight of 40 to 65 calculated according to Equation 1 as provided herein;
    wherein each value for the density, peak melting point and percent crystallinity by weight increases from the core layer to the sub-skin layer and from the sub-skin layer to the skin layer and wherein a ratio of the percent crystallinity by weight of the core layer to the skin layer has a value of 0.25 to 0.91 and a ratio of the peak melting point of the core layer to the skin layer, each expressed in the Kelvin temperature scale, has a value of 0.870 to 0.990.

2. The film of claim 1, wherein a ratio of the density of the core layer to the skin layer has a value of 0.90 to 0.98.

3. The film of claim 1, wherein the core layer to the sub-skin layer the value of the crystallinity increases from 5 to 80 percent and from the sub-skin layer to the skin layer the value increases from 18 to 32 percent.

4. The film of claim 1, wherein the core layer has a density of 0.870 g/cm³ to 0.890 g/cm³ measured according to ASTM D 792; the skin layer has a density of 0.940 g/cm³ to 0.950 g/cm³ measured according to ASTM D 792 and the sub-skin layer has a density of 0.930 g/cm³ to 0.940 g/cm³ measured according to ASTM D 792.

5. The film of claim 1, wherein the machine direction oriented polyethylene film has a thickness of 10 to 125 micrometers (μm).

6. The film of claim 1, wherein the machine direction oriented polyethylene film is oriented at a temperature of 115° C. to 130° C. in the machine direction at a draw ratio of 4.5:1 to 7.5:1.

7. The film of claim 1, wherein the ratio of the percent crystallinity by weight of the core layer to the skin layer has a value of 0.5 to 0.8 and the ratio of the peak melting point of the core layer to the skin layer, each expressed in the Kelvin temperature scale, has a value of 0.892 to 0.973.

8. The film of claim 1, wherein from the core layer to the sub-skin layer the value of the peak melting point increases from 1.5 to 50 percent and from the sub-skin layer to the skin layer the value increases from 5 to 7 percent.

9. The film of claim 1, wherein the core layer and the skin layer are each from 5 to 15 percent of the thickness of the machine direction oriented polyethylene film and the sub-skin layer is 70 to 90 percent of the thickness of the machine direction oriented polyethylene film, wherein the core layer, the sub-skin layer and the skin layer provide 100 percent of the thickness of the machine direction oriented polyethylene film.

10. The film of claim 1, wherein the machine direction oriented polyethylene film exhibits a machine direction 2% secant modulus of 1,000 MPa or more when measured according to ASTM D882.

11. The film of claim 1, wherein the machine direction oriented polyethylene film has a haze 10% or less as measured according to ASTM D 1003.

12. A food package comprising the film of claim 1.

13. A laminate comprising a first machine direction oriented polyethylene film according to claim 1 and a second machine direction oriented polyethylene film according to claim 1, wherein the skin layers (b) of the first and second machine direction oriented polyethylene films are outer layers, wherein the core layer (c) of the first and second machine direction oriented polyethylene films are sealed to each other, and wherein the first machine direction oriented polyethylene film and the second machine direction oriented polyethylene film are formed from a single blown film.

14. D) A method of forming a machine direction oriented polyethylene film, comprising:
extruding a film having:
(a) a core layer comprising a first ethylene-based polymer having a density of 0.885 g/cm$^3$ to 0.920 g/cm$^3$ measured according to ASTM D 792, a peak melting point of 82 to 126° C. and a percent crystallinity by weight of 15 to 30 calculated according to Equation 1 as provided herein;
(b) a skin layer comprising a second ethylene-based polymer having a density of 0.940 g/cm$^3$ to 0.965 g/cm$^3$ measured according to ASTM D 792, a peak melting point of 130 to 135° C. and a percent crystallinity by weight of 30 to 80 calculated according to Equation 1 as provided herein; and
(c) a sub-skin layer in-between and in contact with the core layer and the skin layer, the sub-skin layer comprising a third ethylene-based polymer having a density of 0.920 g/cm$^3$ to 0.950 g/cm$^3$ measured according to ASTM D 792, a peak melting point of 125 to 130° C. and a percent crystallinity by weight of 40 to 65 calculated according to Equation 1 as provided herein, wherein each value for the density, peak melting point and percent crystallinity by weight increases from the core layer to the sub-skin layer and from the sub-skin layer to the skin layer and wherein a ratio of the percent crystallinity by weight of the core layer to the skin layer has a value of 0.25 to 0.91 and a ratio of the peak melting point of the core layer to the skin layer, each expressed in the Kelvin temperature scale, has a value of 0.870 to 0.990; and
orienting the film in a machine direction at a temperature of 115° C. to 130° C. in the machine direction at a draw ratio of 4.5:1 to 7.5:1 to form the machine direction oriented polyethylene film.

15. The method of claim 14, wherein the temperature of orienting the film in the machine direction is within 7° C. of the peak melting point of the core layer.

* * * * *